United States Patent [19]

Sztipanovits et al.

[11] Patent Number: 5,420,977

[45] Date of Patent: May 30, 1995

[54] MULTIPLE ASPECT OPERATOR INTERFACE FOR DISPLAYING FAULT DIAGNOSTICS RESULTS IN INTELLIGENT PROCESS CONTROL SYSTEMS

[75] Inventors: Janos Sztipanovits; Csaba Biegl; Gabor Karsai; Samir Padalkar, all of Nashville, Tenn.; Nobuji Miyasaka, Toyonaka; Koji Okuda, Nishinomiya, both of Japan

[73] Assignees: Vanderbilt University, Nashville, Tenn.; Osaka Gas Co., Ltd., Osaka, Japan

[21] Appl. No.: 135,313

[22] Filed: Oct. 12, 1993

Related U.S. Application Data

[63] Continuation of Ser. No. 602,944, Oct. 24, 1990, abandoned.

[51] Int. Cl.⁶ .............................................. G06F 19/00
[52] U.S. Cl. ..................................... 395/160; 395/161
[58] Field of Search ................. 395/155, 157, 160, 161

[56] References Cited

U.S. PATENT DOCUMENTS

4,710,763 12/1987 Franke et al. ......................... 340/723
4,953,106 8/1990 Gansner et al. ....................... 395/160
4,970,664 11/1990 Kaiser et al. .......................... 395/160

FOREIGN PATENT DOCUMENTS

0243782 11/1987 European Pat. Off. .
0245039 11/1987 European Pat. Off. .
0263636 4/1988 European Pat. Off. .

OTHER PUBLICATIONS

Padalkar et al, Proc. of the Fourth Conf. of Artificial Intelligence for Space Applns., pp. 115–124, 1988.
Sztipanovits et al, International Journal of Intelligent Systems, vol. 3, pp. 269–280, 1988.
Sztipanovits et al, Proceedings of the Third IEEE Conf. on Artificial Intelligence Applications, pp. 126–133, 1987.
Sztipanovits et al, Proceedings of the NASA/JPL Symposium on Telerobotics, pp. 131–139, 1987.
Biegl et al, Innovation et Technologie en Biologie et Medicine, vol. 10, No. 2, pp. 205–216, Feb. 1989.
Sztipanovits et al, Coupling Symbolic & Numerical Computing in Expert Systems, II, pp. 117–128, 1988.
Sztipanovits, Measurement, vol. 7, No. 3, pp. 98–108, Jul.–Sep. 1989.
Sztipanovits et al, Biomed Meas Infor Contr, vol. 1, No. 3 pp. 140–146, 1986.
Sztipanovits et al, IEEE/Seventh Annual Conf. of the Engineering in Medicine & Biology Society, pp. 1132–1136, 1985.
Sztipanovits, Proceedings of the IEEE International Symposium on Circuits & Systems, pp. 2359–2362, 1988.
Blokland et a., Proceedings of the American Control Conf. pp. 620–626, 1988.
Karsai et al, Proceedings of the American Control Conf., 1988.
Karsai et al, Proceedings of the IEEE Symposium of Intelligent Control, pp. 4650–4656, 1990.
Sztipanovits et al, Robotics & Automation, May 1990.

*Primary Examiner*—Mark K. Zimmerman
*Attorney, Agent, or Firm*—Fish & Richardson

[57] ABSTRACT

In a fault diagnostic system, an operator interface simultaneously displays an operations hierarchy and a components hierarchy in two separate windows. The display system is used with a model-based diagnostic system that monitors operational parameters of an industrial process. The diagnostic system identifies possible failure source components in the industrial process and the display system uses these diagnostics to display the most interesting portions of the operations hierarchy and the components hierarchy. The most interesting node, to be displayed with its subtree, is defined as the node at the lowest level of the hierarchy that is both a fault source and that has more children than than other fault sources at that level.

6 Claims, 5 Drawing Sheets

MULTIPLE ASPECT OPERATOR INTERFACE FOR DISPLAYING FAULT DIAGNOSTICS RESULTS IN INTELLIGENT PROCESS CONTROL SYSTEMS

BACKGROUND OF THE INVENTION

This is a continuation of application Ser. No. 07/602,944, filed Oct. 24, 1990, now abandoned.

The present invention relates in general to real-time fault diagnostic systems, and more particularly to a multiple aspect operator interface for displaying fault diagnostic results in a real-time diagnostic system.

In complex industrial processes, a computerized fault diagnostic system is frequently used to monitor alarms and detect possible sources of failure in the industrial process. Real-time fault diagnostic systems observe the operation of processes, detect the appearance and propagation of faults, and continuously update the list of possible fault causes to support the on-line decision making which determines whether to intervene in the process being monitored.

The ultimate purpose of the diagnostic system is to minimize the cost of operation of the industrial process being monitored by finding all possible sources of detected process anomalies as early as possible, and by predicting the prospective impact of the faults on the operation of related process components. These techniques are particularly applicable in chemical and power engineering because of the extreme expense of down-time and the adverse economic effect which can be caused by a degradation of product quality.

Thus, a diagnostic system is frequently used to monitor extremely complex industrial operations, such as in a chemical or power plant. A typical industrial operation can have thousands of components performing hundreds of operations at any given time. Many of these operations are interdependent, and constantly interact with each other. The failure of any one component can potentially affect adversely the performance of other operations that do not directly use the failed component. Therefore, a single component fault can effectively propagate to many other operations, and can set off many different alarms.

When a failure occurs in one or more components, the plant operator is often inundated with data describing many more alarms than actual failures. It is essential that the operator be able to determine what component or components are responsible for a plant failure and what operations have been affected at the different levels of plant operation. The identity of fault source components and affected operations allows repair of the faulty component, shutdown of an operation, or initiation of fault recovery procedures to take place.

Thus, if an operator of a diagnostic system knew which components were responsible for plant failures, effective repair or alternatively, switching to backup components, could be begun quickly. And if the operator knew which operations were affected by the faulty component, future failures might be avoided by inactivating a particular operation. It would also be advantageous to provide continuing updates of the results of a fault diagnostic system analysis as refinements of the diagnosis occur; because by obtaining even partial results, further failures can be avoided and failure recovery actions can be taken.

Therefore, an object of the present invention is an operator interface that allows a quick and correct response to a rapidly evolving fault scenario in a diagnostic system.

Another object of the present invention is an operator interface that simultaneously displays the status of components as well as the status of operations in a diagnostic system.

Another object of the present invention is an operator interface that provides both component and operation information in a diagnostic system at different levels of abstraction.

A further object of the present invention is an operator interface that presents information in a format that can be understood quickly and easily by the operator of a diagnostic system.

SUMMARY OF THE INVENTION

The operator interface of the present invention is used with a model-based diagnostic system that monitors operational parameters of an industrial process. The diagnostic system is based on a hierarchical fault model that uses a directed graph to represent fault nodes and fault propagation paths between plant components and plant operations. The model-based diagnostic system has both on-line and off-line alarm sources and identifies possible failure source components in the industrial process.

The hierarchy is made up of a group of nodes, with the root node being the node from which all other nodes are derived. The hierarchy is defined as a set of hierarchy levels, each level having a group of nodes. A node is assigned to a particular hierarchy level based on the distance of the node from the root node. The root node is in the highest hierarchy level and the leaf nodes are in the lower hierarchy levels.

The operator interface displays the operational hierarchy of the modeled industrial process in one window and displays the component hierarchy of the process in another window. The results of the failure diagnostic system is used to determine which area of the operational hierarchy and the component hierarchy it would be most useful to display to an operator.

The operator interface displays two separate two-dimensional windows simultaneously, one for the operations hierarchy, and one for the components hierarchy. Each window is scrollable in two dimensions, and each window can be moved independently of the other window.

In the preferred embodiment, each node in a hierarchy is preferably displayed in a small block, with the name of the node displayed as text within the block. The background color of each block can be changed dynamically to represent different states of particular components or operations. Lines showing propagation paths are drawn from hierarchical parent to its immediate child(ren).

The display of the entire model hierarchy usually requires an area that is larger than that of the display screen. Therefore, only a portion of the hierarchical model can be shown in one display at a time. The operator can observe particular parts of the hierarchy by scrolling or by using an automatic portion display option.

The automatic portion display option displays the subhierarchy which is rooted at the highest "interesting "node in the hierarchy. In normal operations, the highest interesting node is the root node of the entire graph, that is, the node from which all other nodes are derived.

However, if a fault has occurred, the most interesting node is one that has been diagnosed as a fault source.

The automatic operator interface selects the most interesting node in any hierarchy and displays a selected portion of the hierarchy using the initial most interesting node as the root node. Each hierarchy level is examined to determine which node is the most interesting node at that level. In the preferred embodiment, the most interesting node at a particular level is, of all the nodes that are a fault source, the one with the most children. The method continues examining each hierarchy level, displaying, if a more interesting node is found, the current most interesting node and its sub-tree of nodes, including nodes at lower hierarchy levels. If a more interesting node becomes available at a lower level, that node becomes the most interesting node.

The operator interface then displays the most interesting node and as much of its sub-tree as can be displayed. If there are no faults in the system, the operator interface displays the hierarchical model using the root node, or the highest node in the model, as the most interesting node and the operator is free to scroll through the hierarchical display.

BRIEF DESCRIPTION OF THE DRAWINGS

Other objects, features, and advantages of the invention will become apparent from the description of a particular embodiment, taken in combination with the drawings, in which.

DETAILED DESCRIPTION OF A PREFERRED EMBODIMENT

The operator interface of the present invention is a graphics-oriented color-coded multiple aspect operator interface that graphically (using text also) displays diagnostic results in a fault diagnostic system. A computerized fault diagnostic system is frequently used to monitor alarms and detect possible sources of failure in a complex industrial process. Real-time fault diagnostic systems observe the operation of processes, detect the appearance and propagation of faults, and continuously update the list of possible fault causes in order to support on-line decision making for deciding whether to intervene in the process being monitored.

The operator interface displays the operational hierarchy of the modeled industrial process in one window and displays the component hierarchy of the process in another window. The results of the failure diagnostic system are used to determine which area of the operational hierarchy and the component hierarchy it would be most useful to display to an operator.

As the fault diagnostic system makes refinements to the diagnosis, the operator interface displays can, using an automatic display option, change according to the latest diagnosis. The graphical operator interface of the present invention allows a quick and correct response to a rapidly evolving fault scenario in a diagnostic system.

The operator interface simultaneously displays the status of components as well as the status of operations being monitored by the diagnostic system and provides both component and operation information at different levels of abstraction. The information is presented in a format that can be understood quickly and easily by the operator.

The operator interface simultaneously displays the physical component and the operations aspects of a process, represented as hierarchical graphs, in separate, two-dimensional graphic windows. The complete model of the components and of the operations usually do not fit on one screen. The operator interface therefore can show only a portion, or a "window", of the operation or component hierarchical graph model at one time. The graphic windows can be scrolled in two dimensions by the operator, to look at and review the complete model.

Both the operations and the components being monitored appear to the operator in a graphed hierarchical model. The models consist of components and sub-components or of operations and sub-operations. Individual elements of each hierarchy are represented, in the illustrated embodiment, in a small block containing the name of the individual element. In the illustrated embodiment, the background color of each block can be changed dynamically to reflect the status of the individual component or operation.

Figure 1:
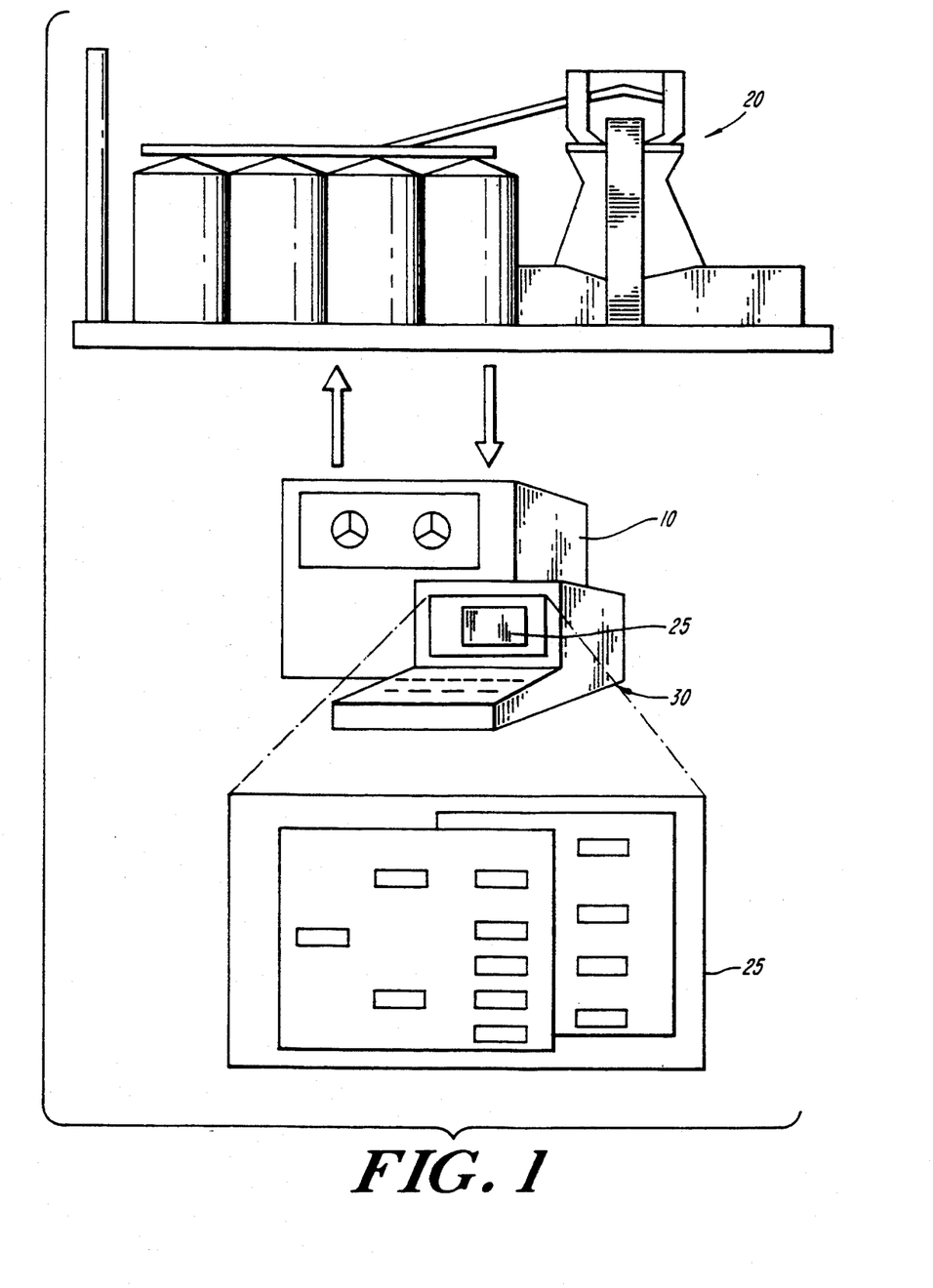
FIG. 1 is a representation of the application environment of the system.

Referring now to FIG. 1, the operator interface of the present invention is used with a model-based diagnostic system 10 that monitors an industrial process 20. The model-based diagnostic system has both on-line and off-line alarm sources and identifies possible failure source components in the industrial process in response to alarm signals. The potential failure source components are displayed on a display 25 of an operator interface 30.

In a preferred embodiment of the present invention, the diagnostic system is based on a hierarchical fault model which uses a directed graph to represent fault nodes and fault propagation paths between plant components and plant operations. The plant components and the plant operations are represented in a hierarchy which is derived from the structural models of plant components and operations respectively.

The hierarchy is made up of a group of nodes, with the root node being the node from which all other nodes are derived. The hierarchy is defined as a set of hierarchy levels, each level having a group of nodes. A node is assigned to a particular hierarchy level based on the distance of the node from the root node. The root node is in the highest hierarchy level and the leaf nodes are in the lower hierarchy levels.

Each hierarchical model consists of nodes (denoted by the circular shapes in the figure) connected by fault propagation paths (the connecting lines in the figure). The fault propagation paths represent how a fault, which occurs at one node, can propagate through the industrial process. Each fault propagation path is characterized by the upper and lower limit of the propagation time, and by the propagation probability.

Figure 2:
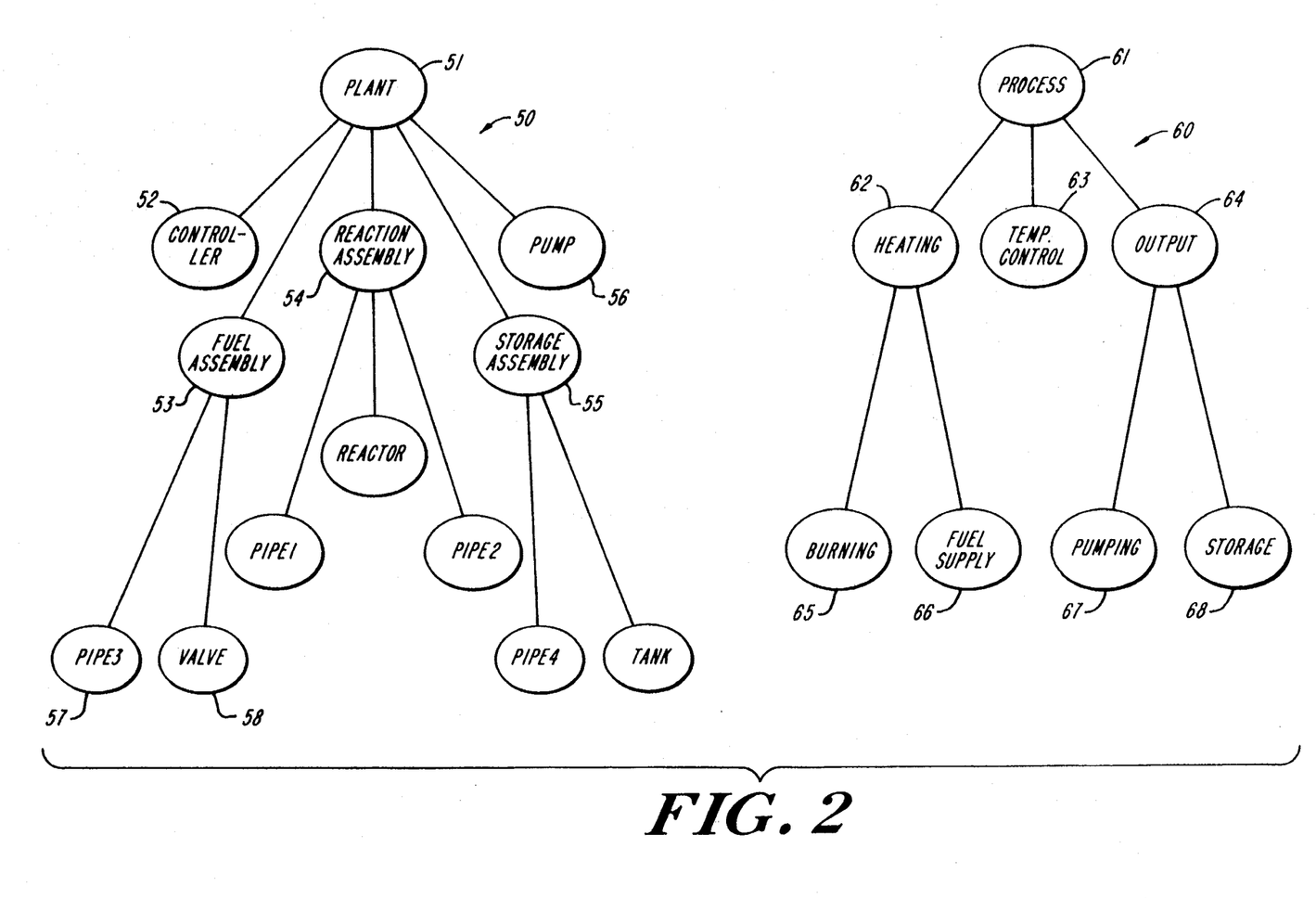
FIG. 2 is an example of a component hierarchical model and an operations hierarchical model.

Referring to FIG. 2, an example of a component hierarchical model 50 and an operations hierarchical model 60 is shown. The plant component hierarchy is a hierarchical decomposition of the components present within the plant. The plant operations hierarchy is a hierarchical decomposition of the operations being performed within the plant.

Referring to FIG. 2, the root node "PLANT" 51 of the plant component hierarchy 50 is the plant itself, and is at the highest hierarchical level. The root node "PLANT" has five children at a second hierarchical level, "CONTROLLER" 52, "FUEL ASSEMBLY" 53, "REACTION ASSEMBLY" 54, "STORAGE ASSEMBLY" 55, and "PUMP" 56. The remaining nodes are at the lowest, or third hierarchical level. These nodes are children of the nodes at the second hierarchical level. For example, nodes "PIPE 3" 57 and "VALVE" 58 are the children of the "FUEL ASSEMBLY" 53 node. A failure occuring at "PIPE 3" 57 would propagate up to "FUEL ASSEMBLY" 53, and finally to "PLANT" 51. When a failure is discovered at a particular component, the hierarchical model can be used to determine both what components at a higher level can be affected by the failure and also what components at a lower level could have failed and caused this particular component to fail.

Figure 3:
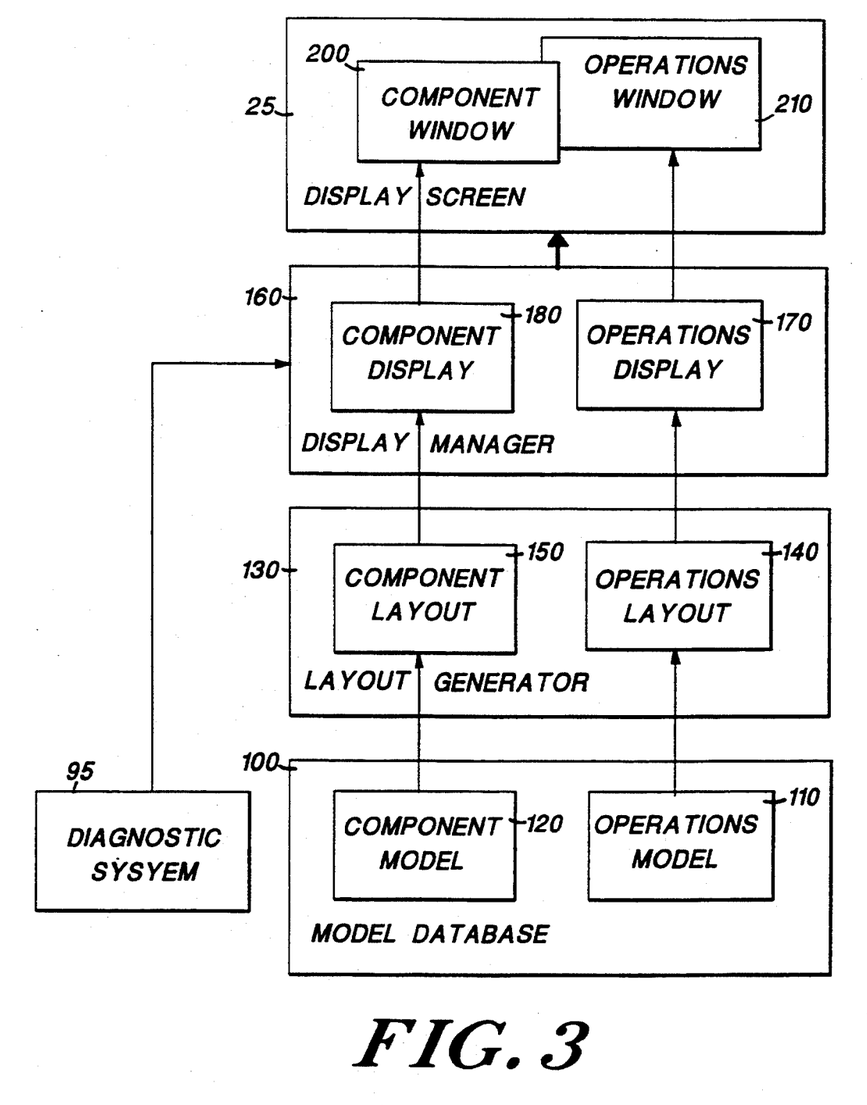
FIG. 3 is a block diagram of the integration of the operator interface with the diagnostics system.

Similarly, in the operations hierarchical model 60, the root node "PROCESS" is the industrial process. The root node has three children, "HEATING" node 62, "TEMP CONTROL" node 63, and "OUTPUT" node 64. The "HEATING" node 62 has two children, "BURNING" node 65, and "FUEL SUPPLY" node 66. When a failure is discovered at a particular operation, the hierarchical model can be used to determine both what operations at a higher level can be affected by the failure and also what operations at a lower level could have failed and caused this particular operation to fail. Referring to FIG. 3, the system integrates the operator interface with the diagnostic system. The model database 100 contains both the component model hierarchy 120 and the operations model hierarchy 110. A layout generator 130 generates a component layout 150 for the component hierarchy 120 and stores it for runtime use. The layout generator 130 also generates and stores an operations layout 140 for the operations hierarchy 110.

A display manager 160 uses the component and operations layouts 140, 150 to display the appropriate portion of each hierarchy, based on the inputs received from the diagnostic system. The display screen 25 displays two separate two-dimensional windows simultaneously, one window 210 for the operations hierarchy, and one window 200 for the components hierarchy.

Each window is scrollable in both dimensions, and each window can be moved independently relative to the other window. The hierarchical model to be displayed usually requires an area that is larger than that available on the display screen. Because the maximum size of the window is fixed by the size of the display screen, typically, only a portion of the model can be shown at a time. The operator can observe particular parts of the hierarchical model by manual scrolling or by using the automatic portion display option.

Figure 4:
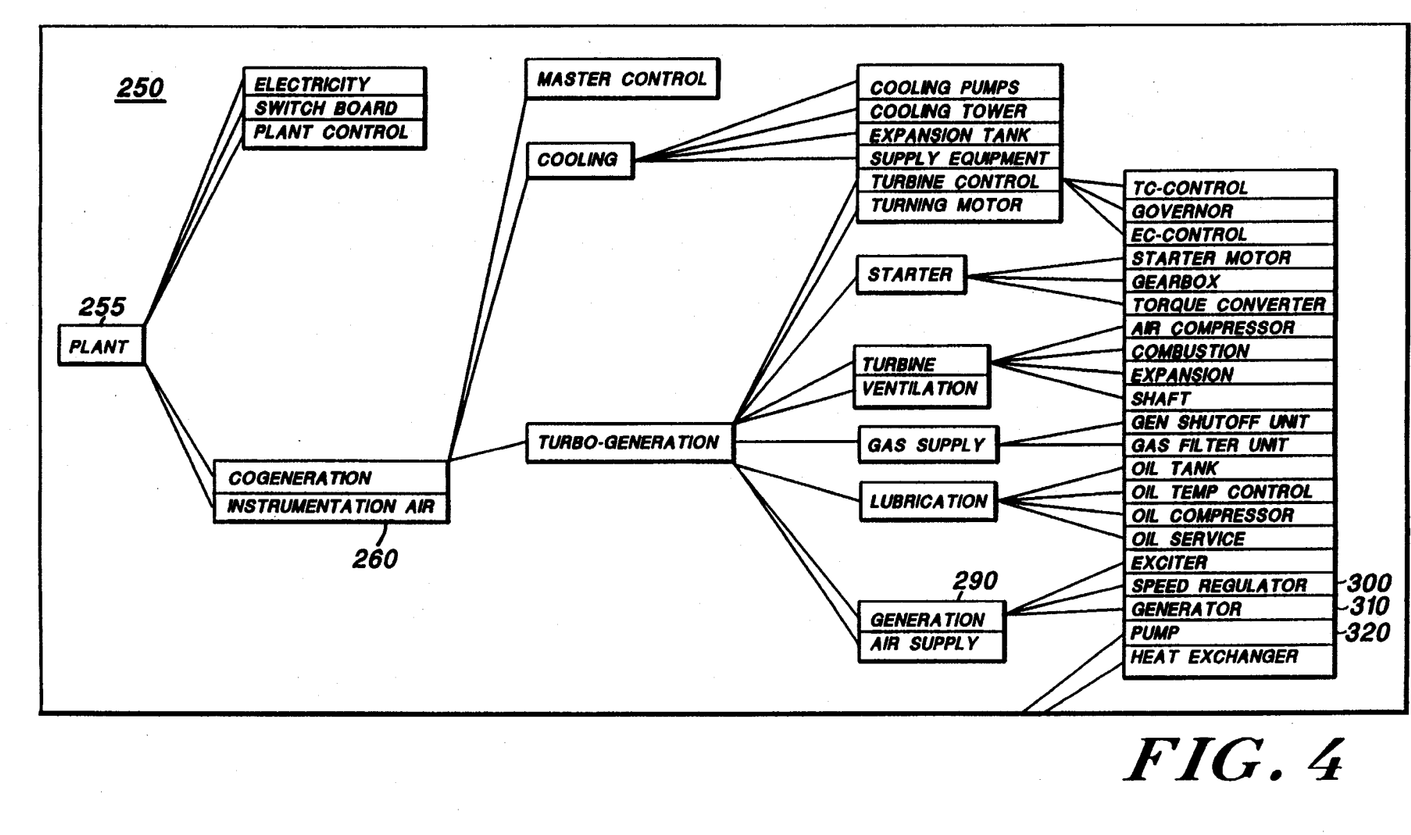
FIG. 4 is an example of a operator display screen using the present invention.

Referring to FIG. 4, an example of an operator display screen of the present invention is shown. The automatic portion display option displays a "sub-hierarchy" which is rooted at the highest "interesting" node in the hierarchy. In normal operations, the highest interesting node is the root node itself. However, if a fault has occurred, the most interesting node is one that has been diagnosed as a fault source.

FIG. 4 shows an example of an operations hierarchy display 250 with root node 255. Each node in a hierarchy, for example node 260, is displayed in a small block, with the name of the node displayed as text within the block. Each hierarchy is displayed in a horizontal orientation, from left to right. Each parent node is displayed as a block in the window that is typically centered with respect to its immediate children. For example, the parent node 290, labelled "Generation" is centered with respect to its child nodes 300 "Exciter" 310 "Speed Regulator" and 320 "Generator". The vertical left hand edges of each node in the same level of the hierarchy are aligned on the same vertical line.

Lines showing propagation paths are drawn from the midpoint of each parent's right hand vertical corner to the midpoint of the left hand edge of each immediate child. The horizontal distance between the left-hand vertical edge of any two blocks of text need not be constant, and may be changed for different applications.

In the illustrated embodiment, color is used to convey analysis information. The color of the text strings within the blocks are black. The background color of each block is changed dynamically to represent different states of particular components or operations. In the illustrated embodiment, the color codes for blocks on the operation hierarchy are:
Green: Operation is normal.
Pink: Operation contains ringing alarms.
Red: Operation is a possible failure source.
Yellow: Off-line alarm information is requested for this operation.
The color codes for blocks on the component hierarchy are:
Green: Component is normal
Red: Component is a possible failure source.

Figure 5:
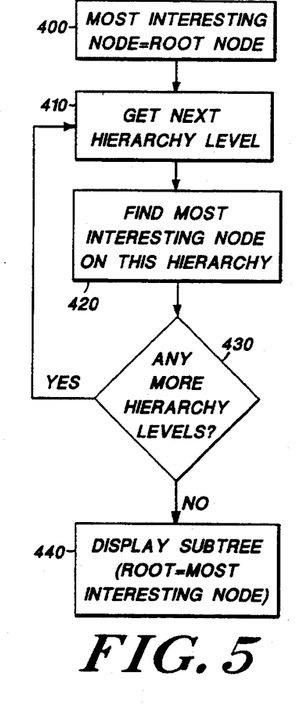
FIG. 5 is a flow chart of the algorithm to find the root node from which to display the hierarchy.

Referring to FIG. 5, the automatic portion display method selects the highest interesting node in a hierarchy and directs the display of selected portions of the hierarchy. Initially, the most interesting node is set at 400 to the root node. Then, the next hierarchy level is obtained at 410 and is examined at 420 to determine if there is a more interesting node at this lower hierarchical level. The system continues examining each hierarchical level (tested at 430), and when all levels have been examined, displays at 440 the sub-tree with the root node being that node determined as being the most interesting node.

Figure 6:
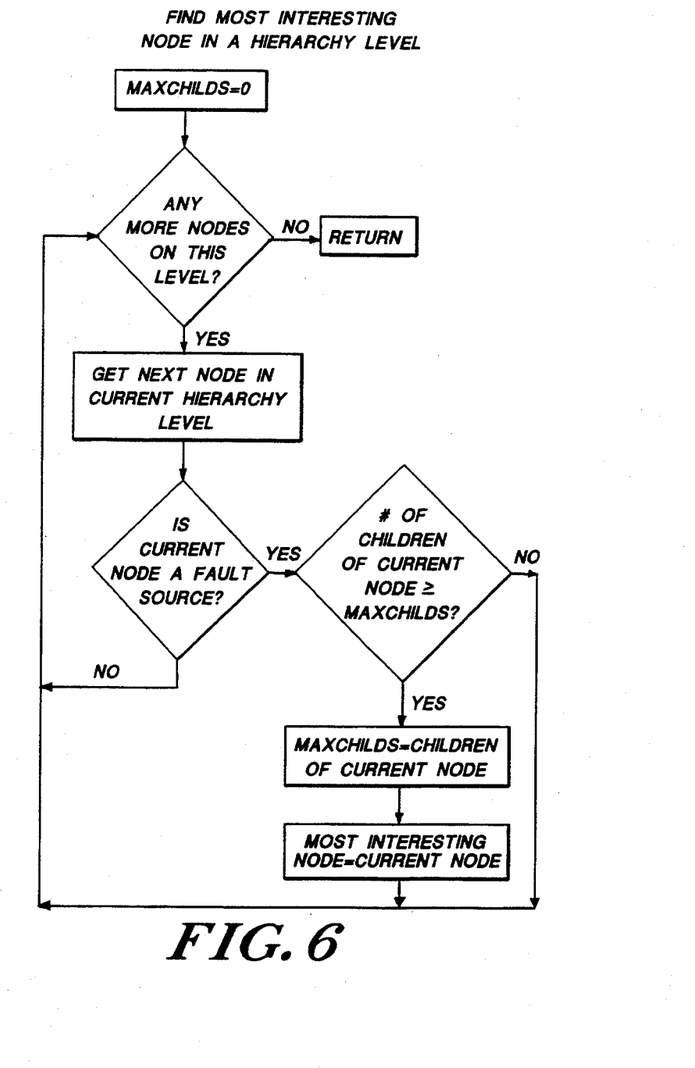
FIG. 6 is a flow chart of the subroutine to find the most interesting node in a hierarchy level.

Referring to FIG. 6, in the illustrated embodiment, the method for determining if a more interesting node exists examines the nodes at each level to find the fault source, if any, with the most children. This node is set to be the most interesting node at that level.

Referring in particular to the flow chart of FIG. 6, the system first zeroes, at 500, the parameter MAXCHILDS. It then fetches, at 510, the next node in the current hierarchical level and it tests, at 520, whether that node, designated the current node, is a fault source. If it is not a fault source, the next node is fetched at 510. If it is a fault source, the system tests, at 530, whether the number of children from that node exceeds the current MAXCHILDS. If it does not, the system returns and obtains the next node of the hierarchical level. If its number of children exceeds the current maximum, the maximum is reset, at 540, and the most "interesting" node is set, at 550, to be the most interesting node. The system checks, at 560, for additional nodes at this hierarchical level, and if there are none returns to the main program.

Thus, if there is a more interesting node at a lower hierarchical level, that node becomes the most interesting node; and the system will display the most interesting node and as much of its subtree as can fit in the display. The most interesting node is initially the root node of the entire hierarchy, and is displayed in the center of the far left of the graph. When, in the preferred embodiment, a more interesting node is found, the display if the most interesting node is shifted to the upper left corner of the display.

While the foregoing invention has been described with reference to a particularly preferred embodiment, it should be understood that various modifications and alterations will occur to those practiced in the art. Such modifications and alterations are intended to fall within the scope of the appended claims.

What is claimed is:

1. A method for interactively displaying results of a diagnostic analysis system used for analyzing operation of a monitored process, comprising the steps of
    providing a hierarchical component model representing a relationship between components of the monitored process, any of the components being a potential faulty component,
    providing a hierarchical process operation model representing a relationship between operations of the monitored process, any of the operations possibly affected by the potential faulty component,
    receiving, from the diagnostic analysis system, signals indicating potential faulty components,
    simultaneously displaying, based on the received signals, in a first display window of a display at least a portion of the hierarchical component model including the potential faulty component and in a second display window at least a portion of the hierarchical process operation model including the operations possibly affected by the potential faulty component, and
    allowing a user to scroll said first window in two orthogonal directions independent of the scrolling in said second window,
    providing a plurality of nodes to each said hierarchical model, each said node being at a hierarchical level in said hierarchical model,
    providing a plurality of propagation paths to each said hierarchical model wherein each said path interconnects two said nodes for representing propagation of information from a node at a lower hierarchical level to a node at a higher hierarchical level;
    designating the node at the highest hierarchical level to be a root node and any node interconnected to a selected node and having a hierarchical level lower than the hierarchical level of said selected node to be a subnode of said selected node; and
    automatically determining, based upon the signals from the diagnostic analysis system, a base-display node which serves as a highest level node of a portion of the hierarchial model to be displayed in one of said windows, said base-display node initially being designated the root node for each hierarchical model,
    providing alarms at associated nodes to each said hierarchical model, each said alarm having a first clear state and a second selected state, and
    wherein said automatic determining step comprises the steps of
    reading current data signals from the diagnostic system wherein said data signals represent the current state of alarms at various nodes,
    determining from said data signals one selected node to designate as the base-display node,
    displaying a subtree of the hierarchical model in one of said windows wherein said base-display node is a highest level node in said subtree, and
    wherein said determining from said data signals step comprises the steps of
    reading the alarms at selected nodes;
    designating any node having an alarm in said selected state as a fault source node;
    determining how many subnodes are interconnected to each fault source node, and designating the fault source node having the most interconnected subnodes as the base-display node.

2. The method of claim 1 further comprising the step of
    altering said display at each node at which a fault or alarm occurs to provide a visual indication of said fault or alarm.

3. The method of claim 2 further comprising the step of
    changing a background color of a block identifying a node having a fault or alarm condition for making a visual presentation of the fault or alarm condition to a user.

4. Apparatus for interactively displaying results of a diagnostic analysis system used for analyzing operation of a monitored process, comprising
    means for providing a hierarchical component model representing a relationship between components of the monitored process, any of the components being a potential faulty component,
    means for providing a hierarchical process operation model representing a relationship between operations of the monitored process, any of the operations possibly affected by the potential faulty component,
    means for receiving signals, from the diagnostic analysis system, indicating potential faulty components,
    means for simultaneously displaying, based on the received signals, in a first display window of a display at least a portion of the hierarchical component model including the potential faulty component and in a second display window at least a portion of the hierarchical process operation model including the operations possibly affected by the potential faulty component, and
    means for allowing a user to scroll said first window in two orthogonal directions independently of the scrolling in said second window,
    wherein each said hierarchical model of the means for providing a hierarchical component model and the means for providing a hierarchical process operation model includes:
    a plurality of nodes, each said node being at a hierarchical level in said hierarchical model,
    a plurality of propagation paths wherein each said path interconnects two said nodes for representing propagation of information from a node at a lower hierarchical level to a node at a higher hierarchical level;
    wherein the node at the highest hierarchical level is a root node and any node interconnected to a selected node and having a hierarchical level lower than the hierarchical level of said selected node is a subnode of said selected node; and
    said apparatus further comprising means for automatically determining, based upon the signals from the diagnostic analysis system, a base-display node which serves as a highest level node of a portion of the hierarchical model to be displayed in one of said windows, said base-display node initially being designated the root node for each hierarchical model;

wherein each said hierarchical model of the means for providing a hierarchical component model and the means for providing a hierarchical process operation model includes:

alarms at associate nodes, each said alarm having a first clear state and a second selected state, and wherein said automatic determining means comprises means for reading current data signals from the diagnostic system wherein said data signals represent the current state of alarms at various nodes, means for determining from said data signals one selected node to designate as the base-display node, and means for displaying a subtree of the hierarchical model in one of said windows wherein said base-display node is a highest-level node in said subtree;

wherein said determining from said data signals means comprises means for reading the alarms at selected nodes;

means for designating any node having an alarm in said selected state as a fault source node;

means for determining how may subnodes are interconnected to each fault source node, and means for designating the fault node having the most interconnected subnodes as the base-display node.

5. The apparatus of claim 4 further comprising
means for altering said display at each node at which a fault or alarm occurs to provide a visual indication of said fault or alarm.

6. The apparatus of claim 5 further comprising
means for changing a background color of a block identifying a node having a fault or alarm condition for making a visual presentation of the fault or alarm condition to a user.

* * * * *